United States Patent [19]

Weber et al.

[11] Patent Number: 5,320,476
[45] Date of Patent: Jun. 14, 1994

[54] SHEET-FILM REMOVAL DEVICE

[75] Inventors: Guenter Weber, Ostfildern; Gerd Hoitz, Unterensingen, both of Fed. Rep. of Germany

[73] Assignee: Eastman Kodak Company, Rochester, N.Y.

[21] Appl. No.: 915,714

[22] PCT Filed: Nov. 15, 1991

[86] PCT No.: PCT/EP91/02154
§ 371 Date: Jul. 2, 1992
§ 102(e) Date: Jul. 2, 1992

[87] PCT Pub. No.: WO88/09523
PCT Pub. Date: Dec. 1, 1988

[30] Foreign Application Priority Data
Nov. 23, 1990 [DE] Fed. Rep. of Germany ....... 4037380

[51] Int. Cl.$^5$ .............................................. G03B 42/04
[52] U.S. Cl. ...................................... 414/416; 271/11; 271/107; 53/284.4
[58] Field of Search ...................... 414/416, 403, 797; 271/106, 107, 11; 53/284.4, 382.1

[56] References Cited
U.S. PATENT DOCUMENTS

| | | | |
|---|---|---|---|
| 2,520,628 | 8/1950 | Elsner | 271/107 X |
| 4,702,061 | 10/1987 | Richardson | 53/382.1 X |
| 4,759,679 | 7/1988 | Müller | 414/416 |
| 5,031,892 | 7/1991 | Stieger | 271/107 X |
| 5,080,344 | 1/1992 | Hayashi | 271/107 |

FOREIGN PATENT DOCUMENTS

| | | | |
|---|---|---|---|
| 23479 | 3/1978 | Japan | 271/107 |
| 127534 | 6/1986 | Japan | 271/107 |
| 8809523 | 12/1988 | PCT Int'l Appl. | |
| 785414 | 10/1957 | United Kingdom | 271/107 |

Primary Examiner—David A. Bucci
Attorney, Agent, or Firm—Frank Pincelli

[57] ABSTRACT

The device is arranged in the form of a complete assembly group on two plates (1,2) screwed together by spacer bolts (18). Guide slots (1a,1b,2a,2b) of similar arrangement and design serve for positively guiding a reciprocable carriage (9,10). The carriage (9,10) comprises a guide member (9) with guide rollers (12,13,33,34) which are supported on ball bearings, bars (3,4) being hinged to the guide member which at their other ends are hinged to drivers (5,6). The drivers (5) are secured to toothed belts (7,8) guided and driven by gear wheels (16,30) mounted on the plates. A carrier (10) is mounted on the guide member (9) so as to be shiftable, liftable and tiltable and supports a pivotally mounted suction plate (11,22). The guide slots are arranged in a position inclined towards the cassette (27) to be unloaded while the toothed belts (7,8) are arranged in an angular position opening in this direction. The guide slots (1b,2b) facing the cassette (27) have in their lower end areas downwardly bent guide sections (1d,2i) which in connection with the angular arrangement of the toothed belt (7,8) cause the suction members (22) to be slowed down when being lowered onto the film (30) to be unloaded.

15 Claims, 4 Drawing Sheets

SHEET-FILM REMOVAL DEVICE

FIELD OF THE INVENTION

The invention relates to a device for removing a sheet film from a cassette with a suction means, said device bending the area of the sheet, which has been attracted by the suction means, towards the sheet plane in order to release the sheet to be removed.

BACKGROUND OF THE INVENTION

In a known device of this type (DE 37 16 904-A1) the suction device is moved into an open cassette by means of a lever linkage and, together with the attracted sheet film, moved in the reverse direction into the area of transport rollers which further advance the sheet film removed. The bending of the attracted sheet film to release it and a compensation in height for adjustment to different cassette sizes is attained by the elasticity of specially designed suction elements and their movable mounting. However, the suction elements of this known device have only a limited range of movement. Moreover, the drive of that suction device is not sufficiently smooth and cannot be optimally controlled for adjustment to the speed most favorable for meeting the various requirements during a sequence of motions.

It is the object of the invention to design a device of the generic type such that the suction device can be reliably controlled for proper functioning and can be moreover driven such that it runs smoothly.

SUMMARY OF THE INVENTION

In one aspect of the present invention there is provided a device for removing film from a cassette with a suction mechanism. The device bending the area of the sheet film, which has been attracted by the suction mechanism, toward the sheet plane in order to release the sheet to be removed. The device is such that the suction device is movable to and fro on a positively guided carriage, the carriage is guided on two parallel plates each having first and second symmetrical guide slots arranged at a distance from each other, the first and second guide slots each comprise sections pointing in the same direction and arranged side by side at an angle inclined towards the open cassette, the second guide slots face the cassette and comprise sections whose end areas adjacent to the cassette are bent off downwardly, one end of a bar is hinged in the area of the carriage guided on the second guide slot, the other end of said bar being hinged to a motor driven toothed belt mounted on the plate, and the carriage consists of a guide member engaging the guide slots and a carrier which is arranged on said guide member and mounted for shifting, pivotal and tilting movement relative to said guide member and on which the suction device is mounted for tilting movement.

According to an advantageous modification of the invention the toothed belt driving the carriage is arranged in an angular position relative to the downwardly inclined guide slots such that the carriage when moving into the downwardly bent sections of the guide slots slows down the downward movement of the suction elements.

According to another advantageous modification the carriage moves in the guide slots of the plates by means of guide rollers supported by ball bearings, which causes the carriage to run very smoothly and reduces the force required for its drive. The plates are connected by spacer bolts such that they enclose a compact assembly group. The plates of the assembly group are advantageously provided with open recesses which allow them to be prepositioned in the intended sheet-film transport path. Advantageously, the plates have mounting holes into which mounting bars positioned on the device can be shifted so that the assembly group can be accurately positioned and secured in the transport path of the sheet film by a simple plugging operation.

The device according to the invention is particularly advantageous in that the suction device can be driven with a relatively small power input to run very smoothly and can be adjusted to any desired sheet-film removal path and in that the suction elements can be placed on the film at a reduced speed, without the motor drive having to be influenced for this purpose, so that the film cannot be damaged. Moreover it offers the suction device an adequate freedom of movement with respect to the bending and release of the sheet film as well as with respect to various positions of the film in the cassette which may be caused by curving, an inclined arrangement or differences in height.

Further features and advantages can be inferred from the description of an embodiment of the invention illustrated in the drawing and from the subclaims.

DESCRIPTION OF THE DRAWINGS

The drawing shows schematically in

DESCRIPTION OF THE PREFERRED EMBODIMENT

The sheet-film removal device according to the invention is part of a unit not illustrated for automatically loading and unloading X-ray sheet-film cassettes such as known for example from DE-37 05 851-A1.

In the known unit, cassettes loaded with an exposed film are opened and the exposed film is removed and transmitted to a transport device which advances the film to a film processing unit.

Figure 1:
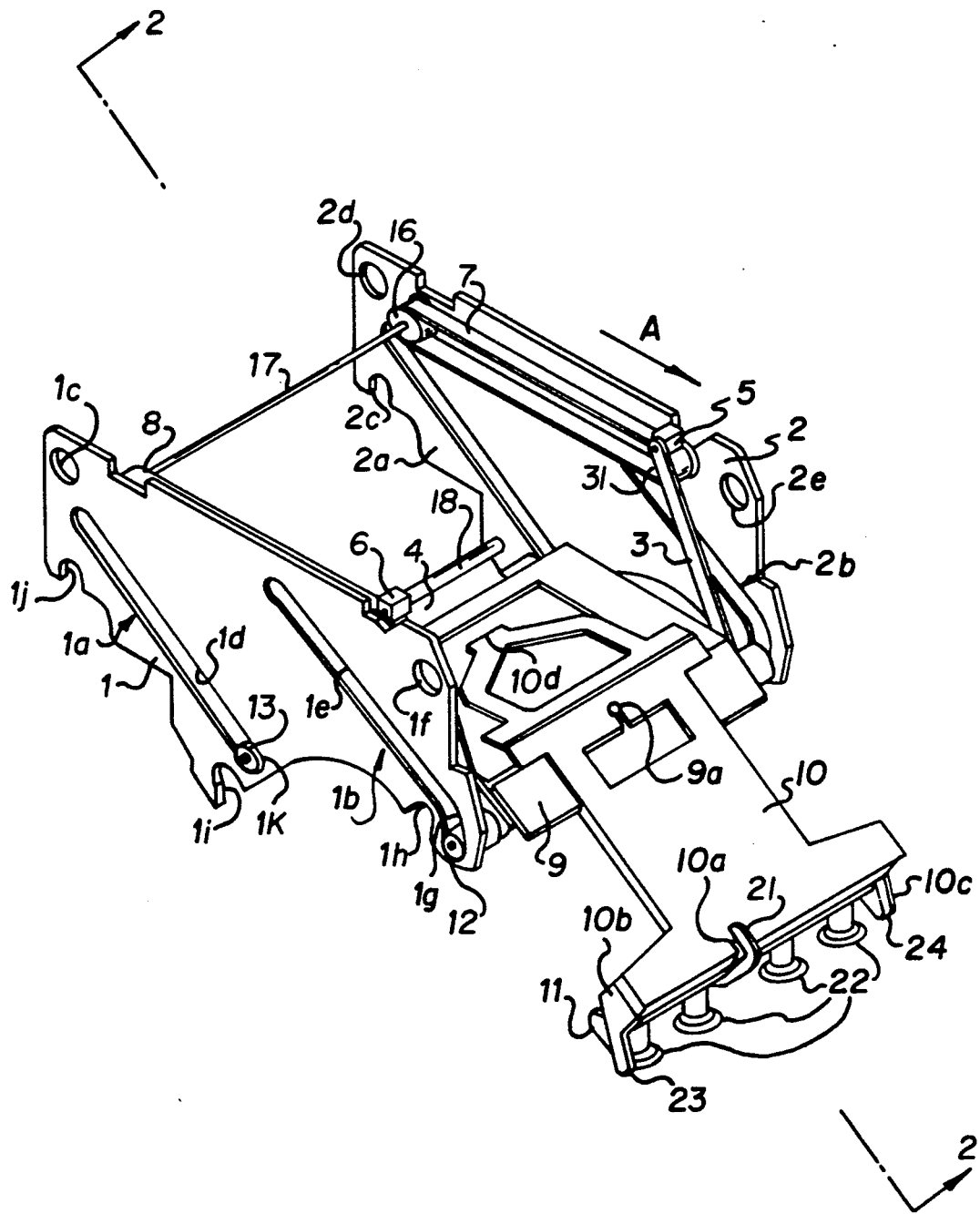
FIG. 1 an oblique view of the device.

The sheet-film removal device required for this purpose forms the subject matter of the invention and will be described in the following:

As shown in particular in FIG. 1 the sheet-film removal device forms a closed assembly group which comprises two parallely arranged and symmetrically designed plates 1 and 2 which are screwed to each other by means of a spacer bolt 18 and on which a carriage 9 and 10 is positively guided and driven by a motor for reciprocating movement.

The carriage 9, 10 is positively guided in guide slots 1a, 1b and 2a, 2b respectively of the plates 1, 2, each of said slots being engaged by guide rollers 12, 13, 33, 34 of the carriage 9, 10, which are mounted on ball bearings (the opposite guide rollers are not visible in FIG. 1).

Carriage 9, 10 consists of a guide member 9 on which a carrier 10 with suction elements 22 is mounted, which is movable in the longitudinal direction and can be tilted and lifted as will be described further below.

Bars 3 and 4 symmetrically hinged to guide member 9 serve for moving said member. For this purpose the bars 3, 4 are hinged with their other ends to drivers 5, 6 which are secured to endless toothed belts 7 and 8. The toothed belts 7 and 8 are guided on gear wheels 16 and 31 which are mounted for rotation on the plates 1 and 2. Gear wheel 16 is driven by a motor not illustrated, which is mounted on plate 2, and, via a shaft 17, is rigidly connected with a gear wheel not illustrated, which drives the opposite toothed belt 8.

The guide slots 1a, 1b and 2a, 2b respectively of the plates 1 and 2 include differently arranged sections which determine in a manner to be described further below the path of movement of the carriage 9, 10 and thus of the suction elements 22.

An electromagnet 19 on the armature 25 of which a joint 32 is arranged for the mounting of a pivotal and shiftable actuating member 21 is secured to a bent-off portion 10e on the lower side of carrier 10. A pressure spring 35 biases armature 25 in opposition to the direction of attraction of the electromagnet 19.

With its free end actuating member 21 is positively guided in a slot 10a of carrier 10 and engages a pin 36 of a pivotally mounted suction plate 11 on which the suction elements 22 are mounted. Suction plate 11 is arranged between two bent-off portions 10b, 10c in a fork-shaped arrangement and pivotably mounted on journals 23, 24 (see in particular FIG. 1). Actuating member 21 is connected with the armature 25 by means of the joint 32 and via a pin-and-slot connection 20, 32a and comprises an inclined surface 21a in the path of movement of which a switch 26 of a function control device known per se and not illustrated is arranged, said switch being mounted to the carrier 10.

Figure 2:
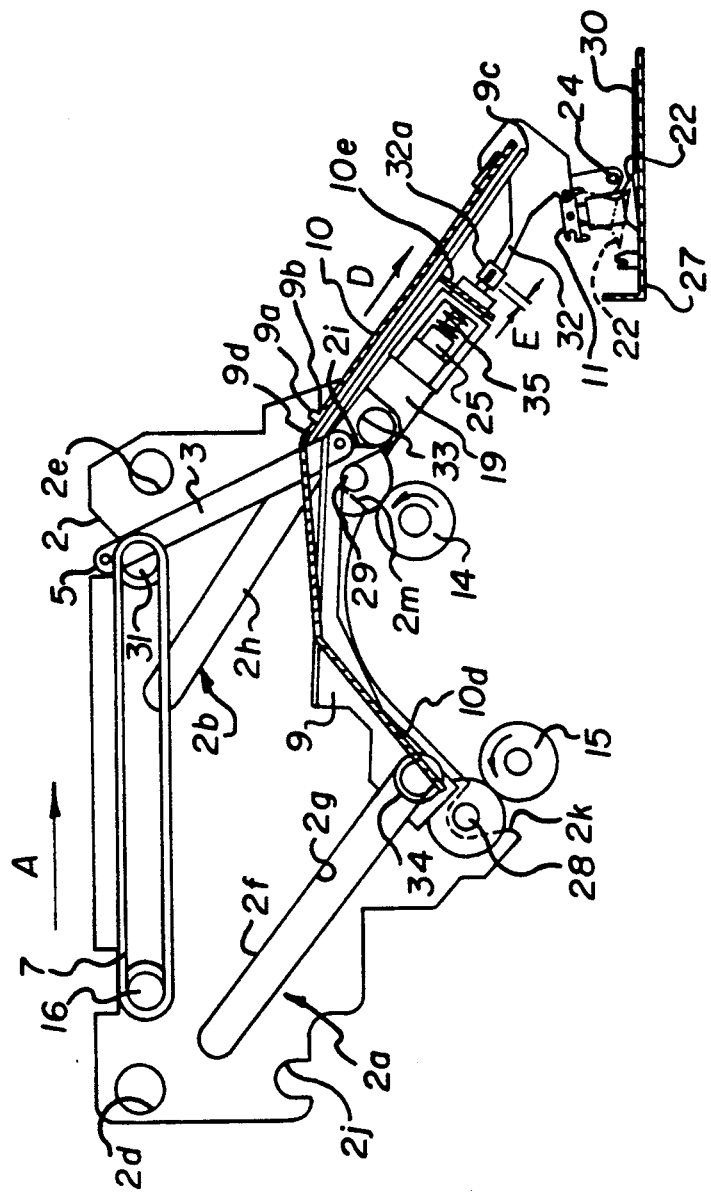
FIG. 2 a longitudinal sectional view, along line F—F in FIG. 1, of the device in the lower sheet-film removal position at the moment of contact.

The pin-and-slot connection 20, 32a allows free movement of the actuating member 21 by a distance "E" as shown in FIG. 2 and thus suction plate 11 to be pivoted to either side by for example 8 and 16 degrees respectively.

The center of gravity of suction plate 11 and its suction elements 22 is selected with respect to the axis of rotation as determined by the journals 23, 24 thereof such that suction plate 11 tilts under the influence of its own weight into the 8-degree position shown in FIG. 2. Owing to the aforementioned freedom of movement of the actuating member 21 by the distance "E", the suction plate 11 can be pivoted from that position into the 16-degree position of the suction elements 22, which is shown in dash-dotted lines.

The carrier 10 is guided in a front and a rear pin-and-slot arrangement not illustrated in detail for longitudinal movement on guide member 9 and with its front end, which faces the suction elements 22, rests directly on guide member 9. In the range of its rear pin-and-slot arrangement 9a, 9d whose pin is designed as a stepped bolt 9a, the carrier 10 rests on step 9b of said bolt and is thus positioned at a distance from guide member 9, which allows carrier 10 to carry out a tilting movement. Carrier 10 is also liftable from guide member 9 within a limited distance with its front end carrying the suction plate 11 so that in connection with the carrier's pin-and-slot arrangement suction plate 11 with its suction elements 22 can move freely within predetermined limits and can readily adapt itself to all possible positions of the sheet film 30 in cassette 27, which may be caused by curving, an inclined arrangement, or differences in height, in that it is tilted and/or lifted and shifted with respect to guide member 9.

The lifting of carrier 10 away from guide member 9 is limited by arms 9c of the guide member 9 (see FIGS. 2 to 4), which extend between suction plate 11 and carrier 10. In the rear area which is associated with the stepped bolt 9a and forms the journal for the lifting and tilting movement of the carrier 10, the movement of the carrier 10 is limited by the housing of the electromagnet 19, which extends in positive engagement below the guide member 9.

Moreover at its end opposite to suction plate 11, the carrier 10 has an arm 10d which is associated with a stationary abutment not illustrated and serves in a manner to be described further below to lift the suction plate 11 and its suction elements 22 respectively from the film as soon as the film has been engaged by a pair of transport rollers 14 also to be described below.

The reciprocating movement of carriage 9, 10 is controlled such that the suction elements 22 when moving towards the cassette are first introduced into the open cassette 27 and then carefully lowered onto the film loaded in cassette 27 while the speed of movement is reduced so that pressure marks on the film are avoided. For this purpose, the guide slots 1b and 2b respectively are provided with corresponding guide sections which will be described in the following with reference to plate 1, the description analogously applying to the symmetrical plate 2.

The rectilinear sections 1d, 1e, 2f, 2h of the first guide slots and of the second guide slots 1a, 1b, 2a and 2b respectively, which are arranged side by side, point in the same direction and are inclined, serve substantially for the rectilinear reciprocating movement of carriage 9, 10.

A downwardly bent portion 1g and 2i respectively of the second guide slot 1b and 2b respectively serves for lowering the suction elements 22 onto film 30 within cassette 27. In order to carry out this movement without jamming the first guide slot 1a and 2a respectively is provided with an enlarged section 1k and 2g respectively which is associated with the lowering movement.

In order that the suction elements 22 are lowered onto the film 30 slowly and without causing damage to the film, the bar 4 (and 3 respectively) is arranged, and associated with the toothed belt 8 (and 7 respectively) such that during forward movement of the driver 5 and 6 respectively in the direction of the arrow "A" the movement of the lower connecting point of bar 3 on the guide member 9 is directed downwardly as soon as the guide roller 12 and 33 respectively enters the downwardly bent portion 1g and 2i respectively of the second guide slot 1b, 2b. With the speed and direction of the drivers 5 and 6 unchanged, the downward movement of the suction elements 22 is thus slowed down so that they can make contact with the film 30 to be removed, without causing any damage.

The slowing down of the downward movement of the suction elements 22 just described can be influenced by the direction of movement of the driver 5 and 6 respectively in relation to the downwardly inclined position of the straight sections 1e, 2h of the guide slots 1b, 2b. As shown in particular in FIGS. 2 and 3, this effect is attained in that the toothed belt 7 (and 8 respectively) is arranged at a relatively obtuse angle with respect to the straight sections 2h (and 1e respectively).

By changing this angular relationship the lowering speed can be influenced such that an increase in the angle leads to a further speed reduction and a decrease to an acceleration with respect to the selected arrangement described.

The assembly group illustrated in FIG. 1 can be easily positioned within the associated device in that it is so inserted that recesses 1b, 1i, 1j (2j, 2k, 2m respectively) arranged on the lower sides of the plates 1 and 2 are placed on shafts 28, 29 of the device (only two of which are illustrated). Bars (not illustrated) which are guided on the device are shifted through positioning holes 1f, 2e and 1c, 2d respectively of the plates 1 and 2 in the pre-aligned assembly group. The plates 1 and 2 are additionally fixed in position by washers. The bars are then screwed to the device so that the assembly group enclosed by the plates 1 and 2 is accurately positioned and reinforced.

Figure 4:
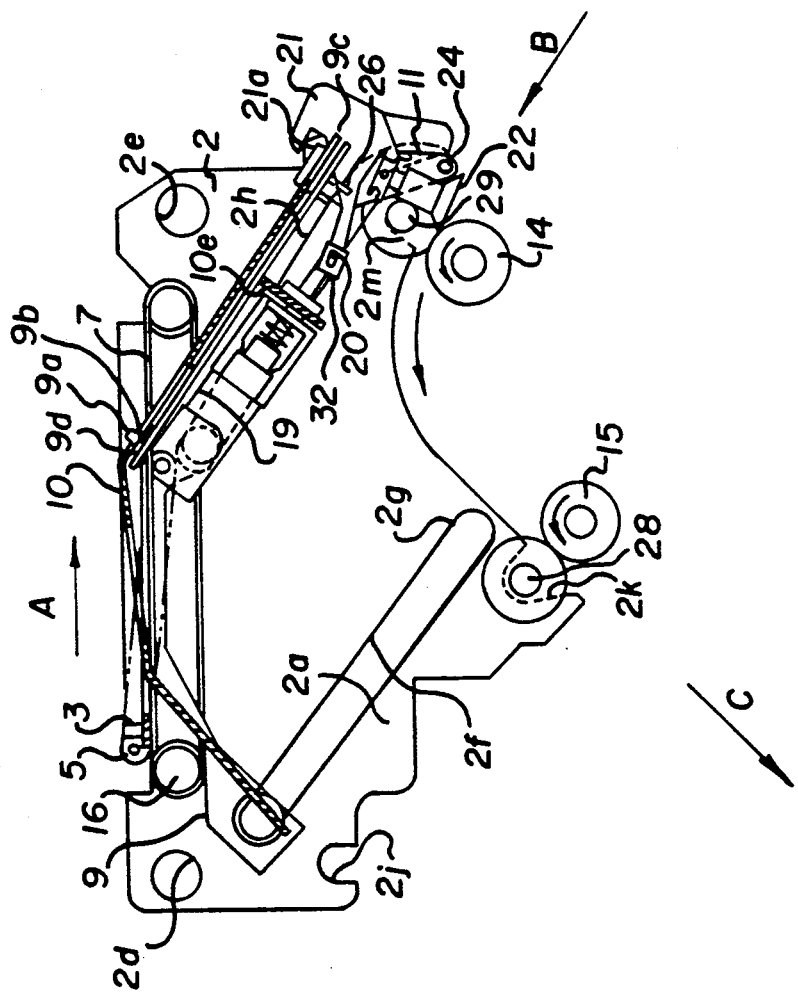
FIG. 4 a longitudinal sectional view, along line F—F in FIG. 1, of the device in its upper film-transfer position.

The device functions as follows:

Starting from an initial position which substantially corresponds to that illustrated in FIG. 4, gear wheel 16 and—via driving shaft 17—the opposite gear wheel and thus both toothed belts 7 and 8 are uniformly driven when the motor is switched on. The drivers 5 and 6 are moved in the direction of the arrow "A" and via the bars 3, 4, move the carriage 9, 10 along the straight sections 1d, 1e and 2f, 2h respectively of the guide slots 1a, 1b and 2a, 2b respectively towards the cassette 27.

Figure 3:
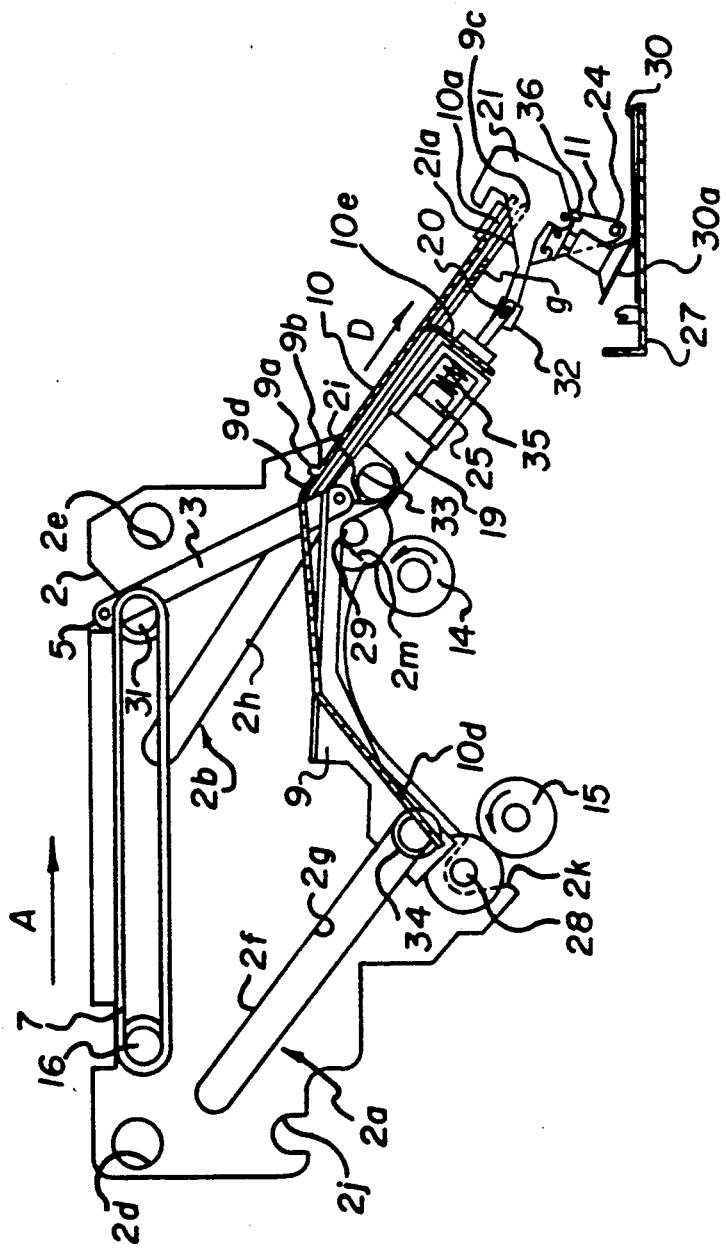
FIG. 3 a view of the device according to FIG. 2 at the moment of bending.

Cassette 27 which is of a known type has a lower portion sketched in FIGS. 2 and 3, in which the film 30 is positioned, and a pivotally hinged lid (not illustrated) which is pivoted to its open position by a device not shown.

As soon as suction plate 11 has arrived above the lower portion of cassette 27, the guide rollers 12, 33 enter the bent sections 1g, 2i of the guide slots 1b, 2b whereby the suction elements 22 are slowly lowered onto film 30 loaded in cassette 27 without the motor drive having to be influenced.

Prior to the contact of the suction elements with film 30 the electromagnet 19 is activated which pivots the suction plate 11 in opposition to the force of pressure spring 35 so that the suction elements 22 assume the position illustrated in FIG. 2 in which they are moved into contact with film 30.

As soon as the carriage 9, 10 has reached a predetermined front position its driving motor is switched off by the drivers 5 and 6 which actuate a known switch not illustrated located within their path of movement. A certain excess travel of the switched-off motor advances the guide member 9 by a slight further distance. As soon as the suction elements 22 have been placed on film 30, the carrier 10 is arrested. The further movement of the guide member 9 caused by the excess travel of the motor is compensated for by the aforementioned capability of the carrier 10 to be shifted longitudinally on guide member 9. Thanks to the pivotable and tiltable carrier 10 and the pivotal mounting of suction plate 11, which allows free movement, the suction elements 22 placed on the film can adapt themselves to any curvature, inclination or difference in height of the film 30 and the lower portion of the cassette 27 respectively.

When suction plate 11 is in its position on the film or shortly before, a vacuum is applied so that the suction elements 22 connected to the plate can attract and hold the film 30. Subsequently, the electromagnet 19 is switched off so that the pressure spring 35 described becomes operative again which moves the armature 25 out and in doing so displaces the actuating member 21 which pivots suction plate 11 clockwise so that the suction elements 22 assume the inclined position shown in FIG. 3. In this inclined position (for example, 35°) the front film end 30a is in a bent position by which the film 30 is released in a known manner from its support.

The electromagnet 19 is only switched on during the relatively short period before the suction elements 22 contact the film 30 while it remains inactivated during the substantially longer remaining period in which the position of the suction plate 11 is fixed by the pressure spring 35.

When the film 30 has been attracted and released by the suction elements 22 the direction of rotation of the driving motor is reversed and the film removed from the cassette 27 by carriage 9, 10 and moved in the direction "B" towards the pair of transport rollers 14 (see FIG. 4).

In the area of the pair of transport rollers 14, a light barrier not illustrated is arranged which is interrupted by the arriving front edge of the sheet film. This activates a control device of a type known per se and not illustrated which, following a predetermined interval, switches off the vacuum applied to the suction elements 22 and ventilates said suction elements. The time interval for the film release of the suction elements 22 is chosen such that the suction elements 22 are inoperative when the film is engaged by the pair of transport rollers 14. At the moment when the vacuum is switched off the suction elements 22 are lifted from the film in order to prevent them from sliding along the film which is now transported by the pair of transport rollers 14. This is attained in that arm 10d of carrier 10 abuts the aforementioned fixed abutment and pivots the carrier 10 counterclockwise about the journal at step 9b of the stepped bolt 9a.

When the carriage 9, 10 has arrived in its upper end position its driving motor is arrested by switches not illustrated which are arranged in the path of movement of the drivers 5 and 6.

The pair of transport rollers 14 advances the film along an arcuate guide path not illustrated to another pair of transport rollers 15 which feeds out the exposed film from the sheet removal device in the direction of the arrow "C" and transfers the film to a film processing unit not illustrated.

As was mentioned before, a switch 26 is arranged in the path of movement of actuating member 21. During the sequence of functions just described during which a film 30 resting on the lower portion of cassette 27 is attracted and bent, switch 26 is actuated at the moment when the suction plate 11 pivots into its tilted position. It is thus detected whether the film has been attracted and released in a functionally correct manner. Only then is the further sequence of functions initiated.

However, if the suction elements 22 rather than coming to rest on a loaded film 30 are placed directly on the inner side of the lower portion of cassette 27, they adhere to the cassette wall or, if an intensifying screen is used, on said screen so that the suction plate 11 cannot be tilted by the pressure spring 35 on electromagnet 19. In such a case, switch 26 is not closed by the actuating member 21 engaging the suction plate 11. If the switch is not actuated the control device generates a signal which switches off the vacuum for the suction elements 22 and causes the carriage 9, 10 to move back into its upper initial position.

Since a film to be unloaded may adhere to the cassette lid a short interval is provided to detect whether an adhering film is released by the air blown in and drops to the lower portion of cassette 27. By repeating the removal operation it is then determined as described above whether a film is present. The operation is repeated up to three times and if no film is detected, a corresponding signal is displayed on the apparatus.

As was described before, carrier 10 is movable within predetermined limits relative to guide member 9, and the suction plate 11 is moreover adapted to tilt to either side. This special design allows the suction plate 11 to adapt itself automatically and reliably to any position of a film (curvature, inclined position, difference in height and the like) so that when the vacuum is applied the suction elements 22 rest reliably on the film without air being inadvertently attracted which could prevent proper functioning. This freedom of movement is of particular advantage if the film is not correctly placed on the edge of the cassette and is therefore disposed in a raised and inclined position, which may happen if the film first adheres to the lid and then drops into the lower portion under the action of the air blown in.

We claim:

1. A device having suction means for removing a sheet film from a cassette, the device bending an area of the sheet, which has been attracted by the suction means, towards a sheet plane in order to release the sheet to be removed, characterized in that the suction means (11, 22) is movable to and from on a positively guided carriage (9, 10);

the carriage (9, 10) is guided on two parallely arranged plates (1, 2) each having a first and a second guide slot (1a, 1b, 2a, 2b) arranged symmetrically and at a distance from each other;

the first and second guide slots (1a, 1b, 2a, 2b) each comprise straight sections (1d, 1e, 2f, 2h) which point in a same direction, are arranged side by side and are inclined at an angle towards the cassette (27);

the second guide slots (1b, 2b) face the cassette (27) and have end areas adjacent to the cassette (27) which comprise sections (1g, 2i) which are bent off downwardly;

a pair of bars (3,4) each having one end hingedly attached to an area of the carriage (9, 10) guided in the second guide slot (1b, 2b) and another end which is hinged to a motor driven toothed belt (7, 8) mounted on plate (1, 2); and the carriage (9, 10) consists of a guide member (9) received in the guide slots (1a, 1b, 2a, 2b) and a carrier (10) which is arranged on the guide member and mounted so as to be shiftable, pivotable and tiltable relative to guide member (9), with the suction means (11, 22) pivotably mounted on the carrier.

2. Device according to claim 1, characterized in that the toothed belt (7, 8) is guided on two gear wheels (16, 30) mounted above the first and second guide slots (1a, 1b, 2a, 2b) such that the toothed belt (7, 8) and the straight sections (1e, 2h) of the second guide slots (1b, 2b) assume an angular position to each other which is open towards cassette (27).

3. A device according to claim 1, characterized in that the carrier (10) comprises at its front end facing cassette (27) fork-shaped bent-off portions (10b,10c) on which a suction plate (11) with suction elements (22) is mounted for pivotal movement about journals (23,24).

4. Device according to claim 3, characterized in that the carrier (10) is mounted so as to be tiltable and shiftable at its rear pin-and-slot connection on a step (9b) of a pin of the guide member (9) designed as a stepped bolt (9a).

5. A device according to claim 1, characterized in that the guide member (9) comprises two arms (9c) which extend between the suction plate (11) and the carrier (10) and limit the pivotal movement of carrier (10).

6. A device according to claim 1, characterized in that on a lower side of carrier (10), an electromagnet (19) is arranged with a spring-biased armature (25) to which an actuating member (21) is hinged which actuating member is positively guided on carrier (10) and held in engagement with suction plate (11).

7. Device according to claim 6, characterized in that a switch (26) of a function control device is arranged on carrier (10) and located in the path of movement of the actuating member (21, 21a).

8. A device according to claim 6, characterized in that the actuating member (21) is held in engagement with the armature (25) of electromagnet (19) by means of a pin-and-slot connection (20,32,32a) which allows a relative movement of suction plate (11).

9. A device according to claim 3, characterized in that the suction plate (11,22) is arranged in an offset position on journals (23,24) such that it is biased to an end position under the influence of its own weight.

10. A device according to claim 1, characterized in that the carrier (10) comprises an arm (10d) at its rear end opposite to its front end, a stationary abutment being arranged in a path of movement of the arm and causing the carrier (10) to pivot about a stepped bolt (9a) which serves as a journal.

11. A device according to claim 1, characterized in that the guide member (9) is guided in the guide slots (1a, 1b,2a,2b) by guide rollers (12,13) supported on ball bearings.

12. Device according to claim 1, characterized in that the carriage (9,10) is driven by two symmetrically arranged toothed belts (7,8), drivers (5,6) and bars (3,4) and in that a gear wheel (16) is rigidly connected with the gear wheel driving the second toothed belt (8) via a driving shaft (17).

13. A device according to claim 1, characterized in that the plates (1,2,) are screwed together by spacer bolts (18) to form an assembly group.

14. A device according to claim 13, characterized in that the plates (1,2) have recesses (1h,1i,1j,2j,2k,2m) at their lower sides, which allow the assembly group to be pre-aligned in a proper orientation.

15. A device according to claim 13, characterized in that the plates (1,2) have positioning holes (1c,1f,2d,2e) which allow the assembly group to be positively and accurately fixed in position.

* * * * *